United States Patent
Erdemir et al.

(10) Patent No.: US 10,275,888 B2
(45) Date of Patent: Apr. 30, 2019

(54) ALGORITHMIC METHOD FOR DETECTION OF DOCUMENTS IN IMAGES

(71) Applicant: Oracle International Corporation, Redwood Shores, CA (US)

(72) Inventors: Erhan Erdemir, Redwood Shores, CA (US); Kenneth Peterka, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 131 days.

(21) Appl. No.: 15/421,106

(22) Filed: Jan. 31, 2017

(65) Prior Publication Data
US 2018/0082426 A1 Mar. 22, 2018

Related U.S. Application Data

(60) Provisional application No. 62/396,044, filed on Sep. 16, 2016.

(51) Int. Cl.
| G06F 17/14 | (2006.01) |
| G06T 7/13 | (2017.01) |
| G06T 7/12 | (2017.01) |

(52) U.S. Cl.
CPC .............. *G06T 7/13* (2017.01); *G06T 7/12* (2017.01); *G06T 2207/10004* (2013.01); *G06T 2207/20032* (2013.01); *G06T 2207/20061* (2013.01); *G06T 2207/30176* (2013.01)

(58) Field of Classification Search
CPC ... G06T 7/13; G06T 3/40; G06T 2207/20032; G06T 2207/20061
See application file for complete search history.

(56) References Cited

U.S. PATENT DOCUMENTS

| 7,301,564 | B2 * | 11/2007 | Fan | H04N 1/387 348/222.1 |
| 8,655,071 | B2 * | 2/2014 | Ferman | G06K 9/3233 382/173 |
| 9,483,834 | B1 * | 11/2016 | Gaiha | G06T 7/0083 |
| 2008/0273807 | A1 * | 11/2008 | Dauw | G06K 9/00456 382/237 |
| 2012/0093434 | A1 * | 4/2012 | Banerjee | G06K 9/3283 382/266 |
| 2014/0212047 | A1 * | 7/2014 | Ferman | G06K 9/3283 382/195 |
| 2016/0092417 | A1 * | 3/2016 | Fang | G06F 17/24 382/172 |
| 2018/0082426 | A1 * | 3/2018 | Erdemir | G06T 7/13 |

* cited by examiner

*Primary Examiner* — Gregory M Desire
(74) *Attorney, Agent, or Firm* — Miller Nash Graham & Dunn LLP

(57) ABSTRACT

A computer-implemented method can include receiving an input image of a physical document, performing down-sampling on the input image, applying median filtering to the input image, applying Canny edge detection to the input image, performing a Hough transform on the input image, computing a quadrilateral having sides that represent borders of the physical document, and providing the computed quadrilateral as an output.

20 Claims, 15 Drawing Sheets

200

300

400

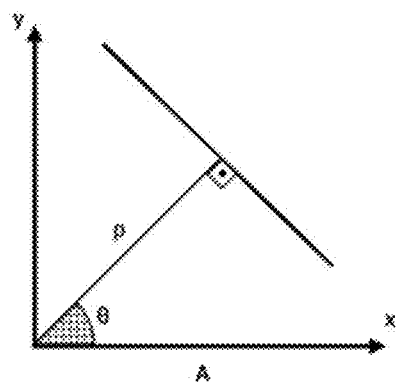 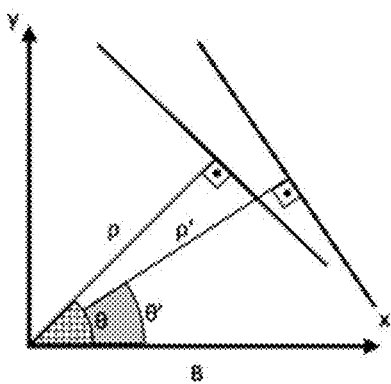
FIG. 7A FIG. 7B

900

ALGORITHMIC METHOD FOR DETECTION OF DOCUMENTS IN IMAGES

CROSS-REFERENCE TO RELATED APPLICATION

This application claims the benefit of U.S. Provisional Patent Application No. 62/396,044, titled "ALGORITHMIC METHOD FOR DETECTION OF DOCUMENTS IN IMAGES" and filed on Sep. 16, 2016, the content of which is hereby fully incorporated by reference herein.

BACKGROUND

Electronic mobile devices such as smartphones, for example, are increasingly used by people to effectively digitize paper documents by capturing a photo image of each such document using a camera that is typically coupled with and/or integrated with the electronic mobile device itself. For example, if a user goes out to eat at a restaurant for a meal, he or she may prefer to keep a digitization of the check and/or receipt rather than having to deal with original paper copies.

Due to the nature of traditional image capture processes, however, the use of an original picture is not ideal. For example, such captured images frequently include parts of the background, which unnecessarily increases the corresponding file size and also causes undesirable problems with subsequent image processing operations such as perspective transform and optical character recognition (OCR). Moreover, attempting to capture an image of a document without the background by adjusting the camera position and zoom is a tedious and inefficient process.

Accordingly, there remains a need for improved techniques for detecting a document's boundaries in a captured image thereof and potentially removing non-document regions therein.

BRIEF DESCRIPTION OF THE DRAWINGS

FIG. 7A illustrates an example of how theta and rho may be defined for use in determining line segment similarity in accordance with certain embodiments of the disclosed technology.

FIG. 7B illustrates an example in which two line segments may be considered to be similar if their theta and rho values are within a specified threshold.

DETAILED DESCRIPTION OF THE EMBODIMENTS

Implementations of the disclosed technology advantageously provide a user with the ability to quickly take a picture of a document and then automatically "find" the document within the image, e.g., by detecting the document's boundaries. Such techniques greatly improve image capture process efficiency as well as user adoption.

Implementations of the disclosed technology are generally directed to methods for determining the location of a single-page document within a captured image, e.g., by determining the location of the corners of the document. The image may have been captured by a camera, e.g., of a mobile electronic device, at an angle that is not necessarily perpendicular to the document, for example.

Certain prior techniques include the use of a Hough transform, which is a standard method used in document image processing to detect linear structures like document borders, for example. The immediate result of a standard Hough transform, however, is a set of line segments that often includes many undesirable elements. Also, while the border of a document within an image may be represented as a quadrilateral, the process of constructing a quadrilateral from a set of line segments obtained from a Hough transform is not straightforward.

Existing products fail to accurately detect the borders of a document within an image for any of a number of reasons, such as the following: a background color is too close to the color of the document paper; the existence of shadows over the document; a partial occlusion of the document (e.g., due to a finger of the user being inadvertently held in front of the lens during the image capture); the document not being entirely within the image; the existence of certain types of text and graphics in the document; the existence of certain types of geometrical shapes in the background; and the existence of flaws such as tears, wrinkles, creases, stains, or a combination thereof on the document itself. Further, certain prior applications disadvantageously have restrictions on the size, location, and orientation of the document within the image.

Figure 1:
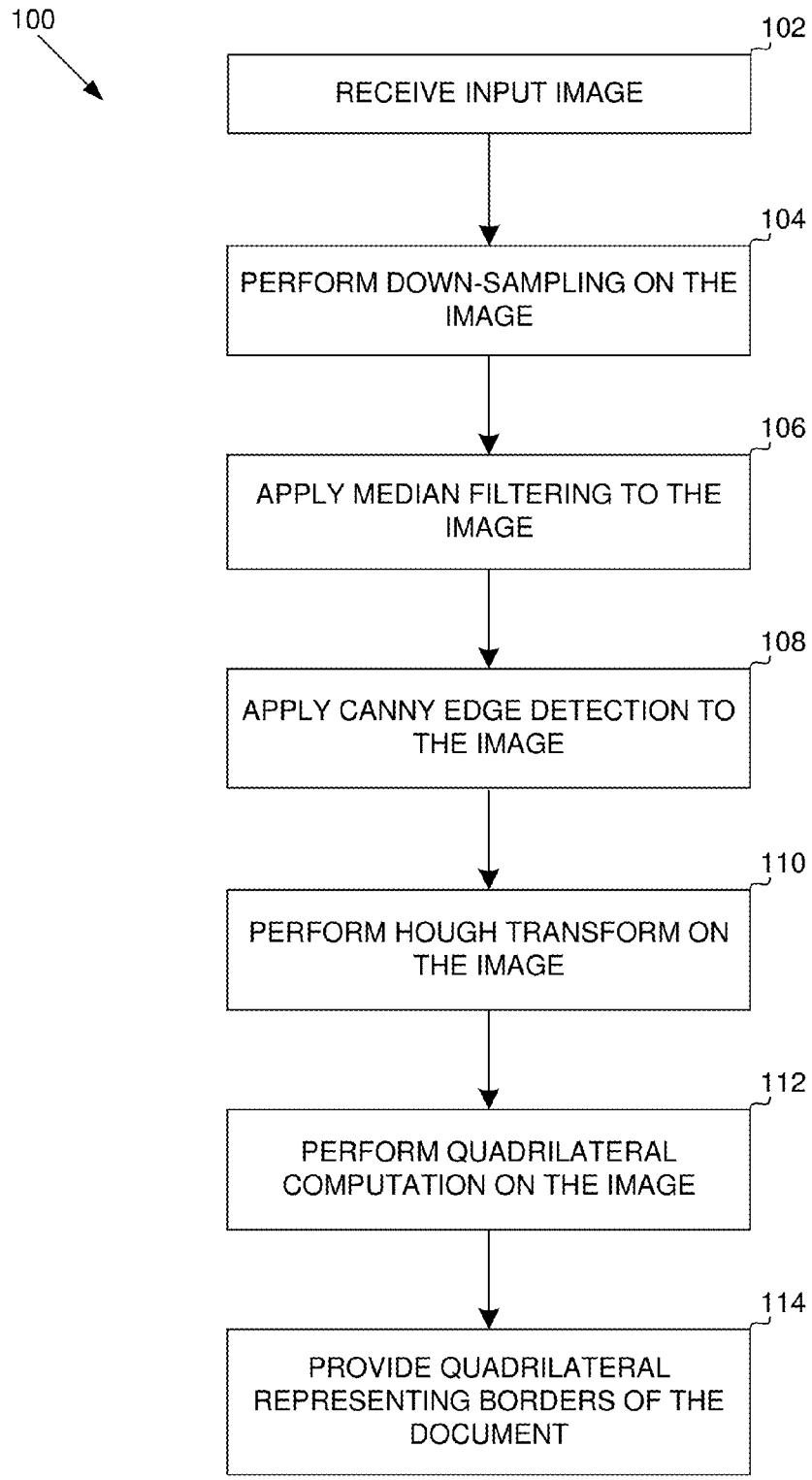
FIG. 1 illustrates an example of a computer-controlled method in accordance with certain embodiments of the disclosed technology.
Figure 2:
FIG. 2 illustrates an example of an input image of a paper document.

FIG. 1 illustrates an example of a computer-controlled method 100 in accordance with certain embodiments of the disclosed technology. At 102, an input image of a physical document, e.g., the original captured image, is received, e.g., by a processor. Such document image capture may be performed by a mobile electronic device, such as a smartphone, that is operated by a user of the device. The input image is typically an 8-bit grayscale image having pixel values in the [0-255] range. FIG. 2 illustrates an example of an input image 200 of a paper document. In the example, the document is a receipt for the purchase of a meal at a restaurant and the resolution of the image is 2448×3264 pixels.

Figure 3:
FIG. 3 illustrates an example of an image resulting from down-sampling the image of FIG. 2.

At 104, down-sampling is performed on the image, e.g., by the processor. Such down-sampling may advantageously decrease computation time, e.g., by decreasing the number of pixels to process, and also remove any fine details that may adversely affect subsequent document edge detection because such down-sampling generally has a blurring effect. FIG. 3 illustrates an example of an image 300 resulting from down-sampling of FIG. 2. In the example, the image 300 results from a 0.125 down-sampling ratio applied to the image 200 of FIG. 2. The size of the down-sampled image 300 in the example is 306×408 pixels.

Figure 4:
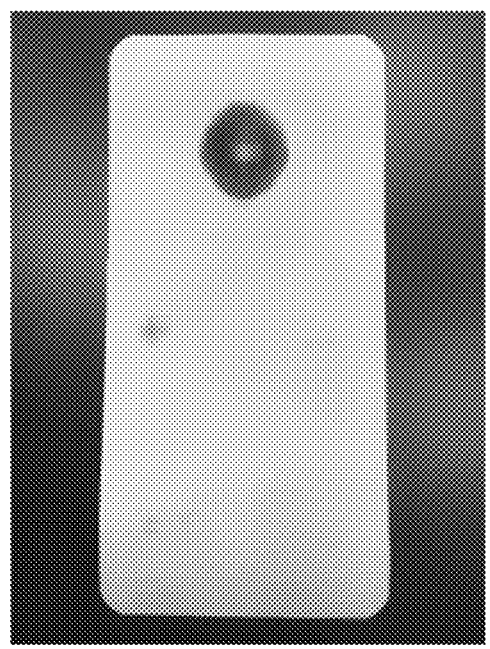
FIG. 4 illustrates an example of an image resulting from median-filtering the image of FIG. 3.

At 106, median filtering is applied to the image, e.g., by the processor. Such median filtering may advantageously remove any or all fine details within the image that may adversely affect document edge detection. Text and other graphical objects, especially line segments, inside the document are generally targeted, along with linear structures in the background. Depending on the selection of kernel width, details up to a certain size may be effectively removed without affecting the edges of the document. FIG. 4 illustrates an example of an image 400 resulting from median-filtering the image of FIG. 3. In the example, the kernel size is 27×27 pixels.

Figure 5:
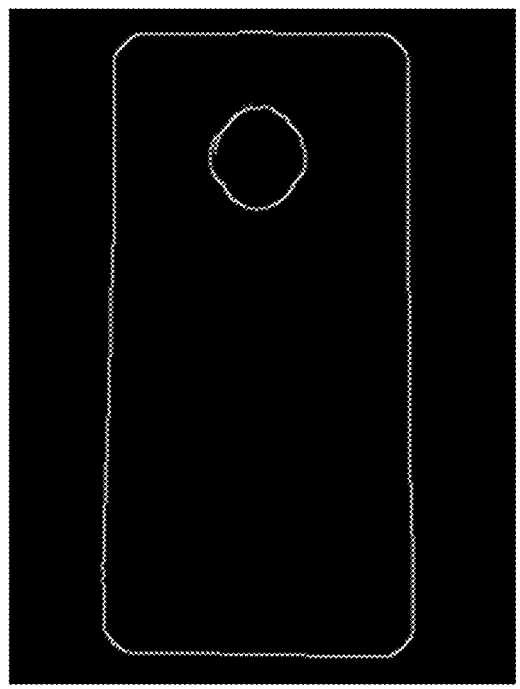
FIG. 5 illustrates an example of a result of Canny edge detection being applied to the image of FIG. 4.

At 108, Canny edge detection is applied to the image, e.g., by the processor. The document border may be detected using a Canny edge detector, and the values of certain parameters of the edge detector (e.g., upper/lover thresholds, aperture size) may be selected to increase and potentially maximize detection of the document's border while minimizing and potentially eliminating false positives. FIG. 5 illustrates an example of a result 500 of Canny edge detection being applied to the image of FIG. 4. In the example, the lower threshold is 50, the upper threshold is 150, and the aperture size is 3 pixels.

Figure 6:
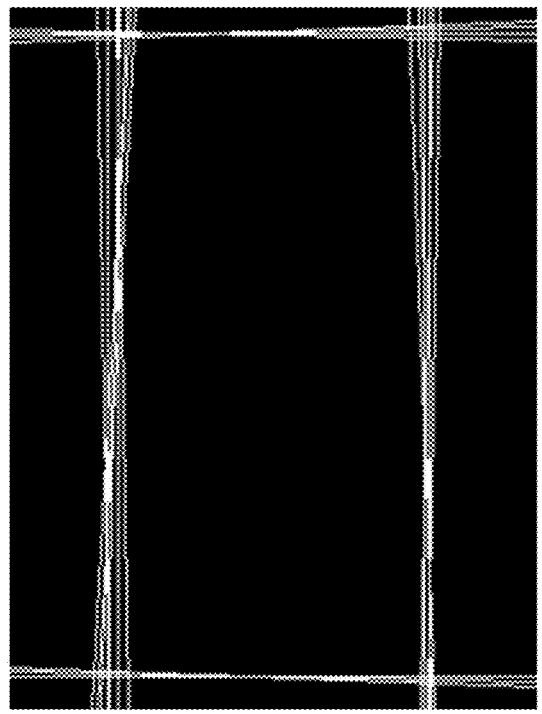
FIG. 6 illustrates an example of a result of a Hough transform being applied to the result of FIG. 5.

At 110, a Hough transform is performed on the image, e.g., by the processor. A Hough transform is a standard method to detect linear structures, such as the sides of a document, for example, in an image. The output of edge detection, which is a binary image, may be used as input. As a result, a set of line segments may be generated. The standard Hough transform may output distinct line segments that are similar with respect to a similarity metric. FIG. 6 illustrates an example of a result 600 of a Hough transform being applied to the result of FIG. 5. In the example, there are four groups of line segments, one for each side of the document.

Certain implementations of the disclosed technology may include grouping similar line segments and then computing a representative for each group. Each line segment may be represented in polar coordinates. For example, rho (ρ) may be used to represent the distance from the origin to the line segment, and theta (θ) may be used to represent the angle between the positive x-axis and the line that is both perpendicular to the line segment and also passing through the origin.

Two or more similarity metrics may be used, and two line segments may be considered similar if they are similar with respect to any of the similarity metrics. The first similarity metric may be based on theta and rho such that two line segments may be considered similar if their theta and rho values are both within a specified threshold, for example. FIG. 7A illustrates an example 702 of how theta and rho may be defined for use in determining line segment similarity. FIG. 7B illustrates an example 704 in which two line segments may be considered to be similar if their theta and rho values are within a specified threshold.

The second metric may be based on the location of the intersection points the line segments have with the sides of the document image. Each line segment intersects with the sides at two points, and corresponding intersection points of the line segments are the ones that are closer to each other. If the corresponding intersection points are within a specified threshold, the line segments may be considered to be similar. In certain implementations, this threshold may be determined using the following: threshold=threshold_factor*minimum(image_width, image_height), where the threshold_factor may have a range of 0.02-0.2. There may be a default threshold of 0.05, for example.

Figure 8:
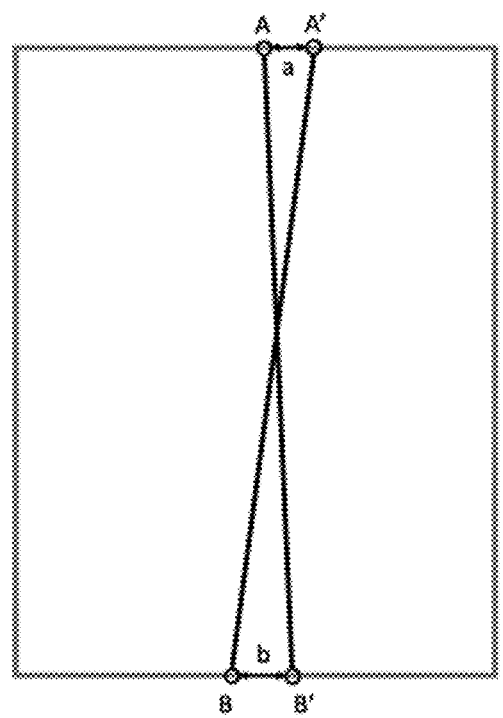
FIG. 8 illustrates an example in which similarity of line segments is based on their points of intersection with the borders of a document image in accordance with certain embodiments of the disclosed technology.

FIG. 8 illustrates an example 800 in which similarity of line segments is based on their points of intersection with the border of a document image. In the example 800, the line segments may be considered to be similar if the distances (a and b) between the corresponding intersection points ((A, A') and (B, B')) are within the threshold.

Figure 9:
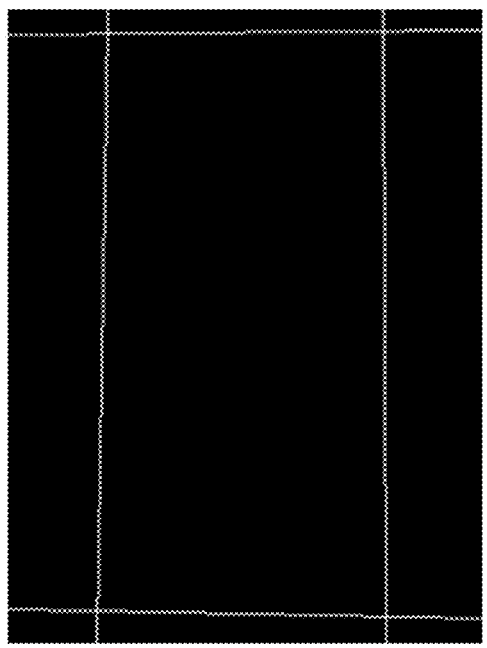
FIG. 9 illustrates an example of a result from line segment clustering in which a line segment has been created for each group.

Line segment groups may be populated by starting with a single line segment in a single group and comparing each subsequent line segment with all of the line segments in the existing groups for similarity. If a similar segment is found, it may be added to the same group. If no similar segment is found, it may be added to a new group. Once the groups are determined, an "average" line segment for each group may be computed such that the corresponding theta and rho values are the averages of the theta and rho values of the line segments within the group. FIG. 9 illustrates an example 900 of a result from line segment clustering in which a line segment has been created for each group.

At 112 of the method 100 illustrated by FIG. 1, a quadrilateral computation is performed on the image. Based on the line segments identified at 110, the computation may include deeming the locations of four points as corners of a quadrilateral corresponding to the document within the image. This computation may be based on the number of line segments involved.

In situations where there are no line segments, e.g., when the document covers the entire image, the entire image may be taken as the quadrilateral.

In situations where there is a single line segment, e.g., when only one side of the document is within the image, the line segment may intersect with any two of the sides/corners of the image, effectively dividing the image into two parts.

Figures 10A, 10B:
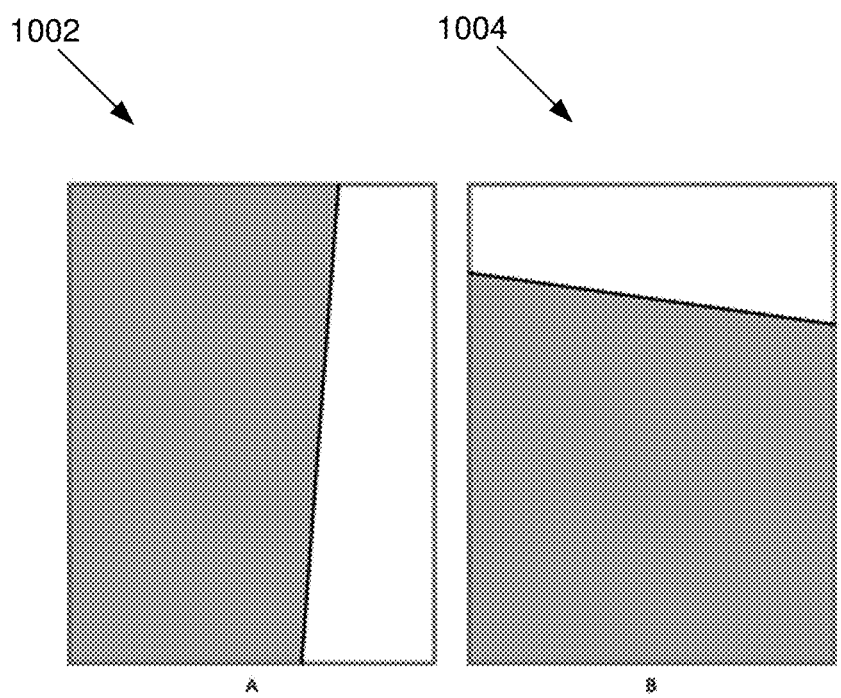
FIG. 10A illustrates an example in which a line segment intersects with the borders of an image at the top and bottom sides.
FIG. 10B illustrates an example in which a line segment intersects with the borders of an image at the left and right sides.

If a single line segment intersects with the top and bottom sides of the image, the line segment divides the image into two quadrilaterals and the quadrilateral having a larger area (e.g., left or right quadrilateral) may be taken as the quadrilateral. FIG. 10A illustrates an example 1002 in which a line segment intersects with the borders of an image at the top and bottom sides. In the example, the quadrilateral having a larger area, as indicated by gray shading (i.e., the left quadrilateral), may be taken as the quadrilateral.

If a single line segment intersects with the left and right sides of the image, the line segment divides the image into two quadrilaterals and the quadrilateral having a larger area (e.g., top or bottom quadrilateral) may be taken as the quadrilateral. FIG. 10B illustrates an example 1004 in which a line segment intersects with the borders of an image at the left and right sides. In the example, the quadrilateral having a larger area, as indicated by gray shading (i.e., the bottom quadrilateral), may be taken as the quadrilateral.

In situations where four points cannot be computed, the whole image may be taken as the quadrilateral.

If a single line segment intersects with a side and a corner, the line segment divides the image into a triangle and a quadrilateral. In such situations, the quadrilateral may be taken as the quadrilateral.

If a single line segment intersects with two diagonal corners, the line segment divides the image into two triangles. In such situations, the line segment may be ignored and the entire image may be taken as the quadrilateral.

In other situations, a single line segment may divide the image into a triangle and a pentagon. If, for at least one of the intersection points, the distance between the point and the nearest corner is below a certain threshold, the intersection point may be moved to that corner and the resulting quadrilateral may be taken as the quadrilateral. In certain implementations, this threshold may be determined using the following: threshold=threshold_factor*(length of the side the point is on), where the threshold_factor may have a range of 0.05-0.5. There may be a default threshold of 0.25, for example.

Figures 11A, 11B:
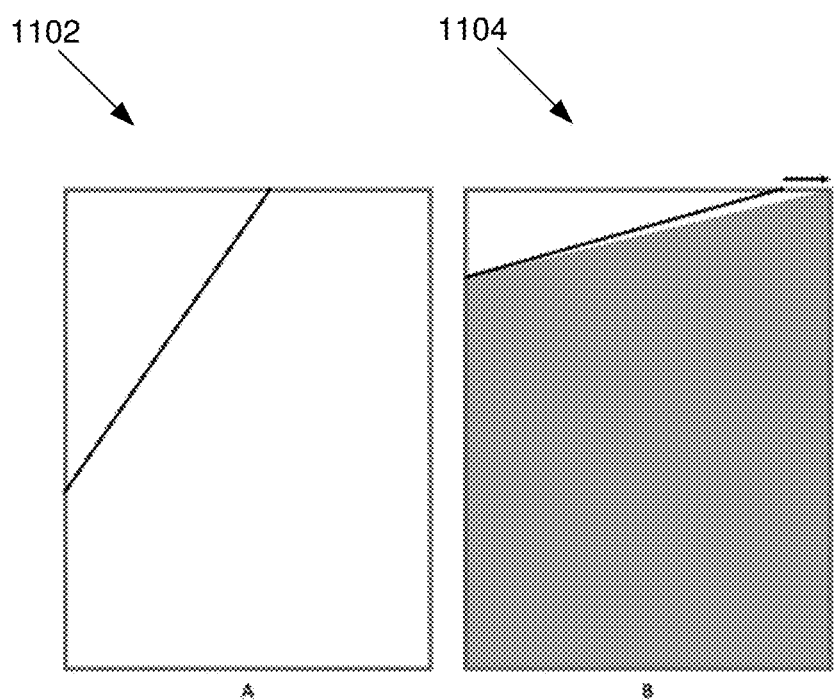
FIG. 11A illustrates an example in which a line segment divides an image into a triangle and a pentagon.
FIG. 11B illustrates an example in which an intersection point is moved to the nearest corner of the image illustrated by FIG. 11A.

FIG. 11A illustrates an example 1102 in which a line segment divides an image into a triangle and a pentagon. FIG. 11B illustrates an example 1104 in which an intersection point is moved to the nearest corner of the image illustrated by FIG. 11A. In the example, the resulting quadrilateral, as indicated by the gray shading, may be taken as the quadrilateral.

In certain situations, there are two line segments, e.g., when two opposing or adjacent sides of the document are within the image. In such situations, the two intersection points with sides of the image may be computed for each line segment.

Figures 12A, 12B:
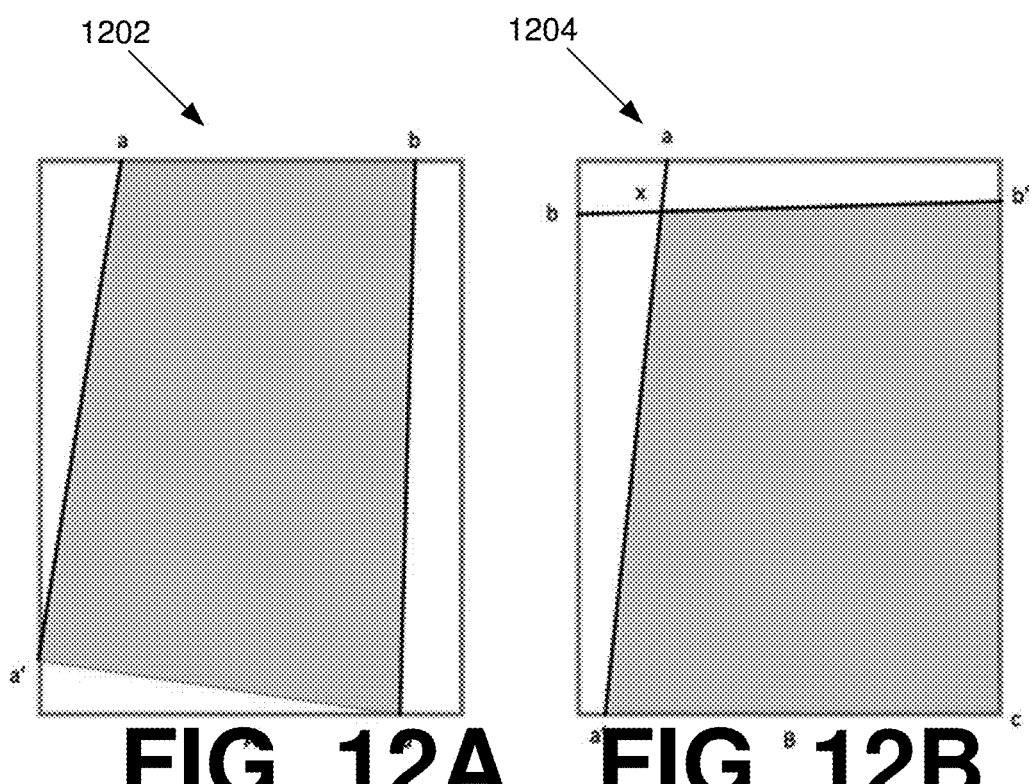
FIG. 12A illustrates an example in which two line segments within an image do not intersect.
FIG. 12B illustrates an example in which two line segments within an image intersect.

If the line segments do not intersect, the total of four intersection points between the line segments and the sides of the image form the quadrilateral. FIG. 12A illustrates an example 1202 in which two line segments within an image do not intersect. In the example, a quadrilateral formed by the intersection points between the line segments and the image border (a, a', b, b') is taken as the quadrilateral.

In situations where two line segments do intersect, the image may be divided into a set of shapes, each of which may be a triangle, a quadrilateral, or a pentagon, based on the location and orientation of the line segments. In such situations, the largest quadrilateral, if any, may be selected. FIG. 12B illustrates an example 1204 in which two line segments within an image intersect. In the example, the largest quadrilateral, as indicated by the gray shading, is taken as the quadrilateral.

Figure 13:
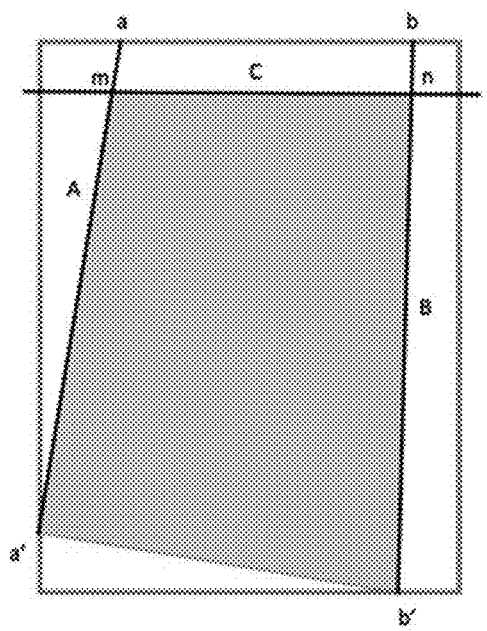
FIG. 13 illustrates an example in which a quadrilateral may be determined from three line segments within an image in accordance with certain embodiments of the disclosed technology.

In certain situations, there are three line segments within an image, e.g., when three sides of the document are within the image. Such situations may be common when the document is a long receipt, for example. FIG. 13 illustrates an example 1300 in which a quadrilateral may be determined from three line segments within an image in accordance with certain implementations of the disclosed technology.

If one of the line segments (i.e., segment C) intersects the other two line segments (i.e., A and B) at two different points (i.e., m and n), those two points are two of the corners of the quadrilateral. The two remaining corners may be computed by finding the two intersection points for segments A and B each with the image border ((a, a') and (b, b'), respectively) and selecting the one that is farther from the point of intersection with segment C. In the example, a' is selected because it is farther away from point m than point a, and b' is selected because it is farther away from point n than point b.

Figure 14:
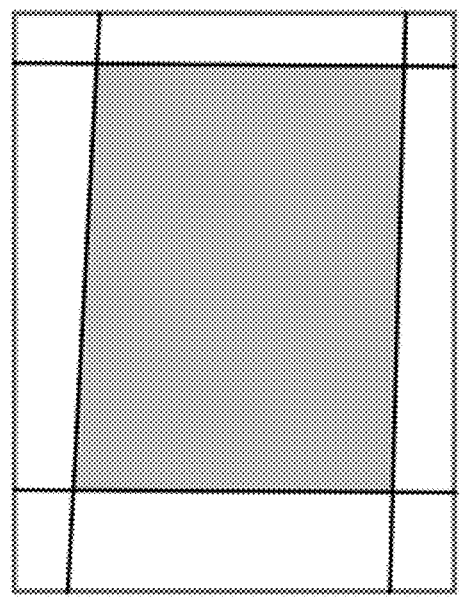
FIG. 14 illustrates an example in which a quadrilateral may be determined from four line segments within an image in accordance with certain embodiments of the disclosed technology.

In certain situations, there are four line segments within an image, e.g., when four sides of the document are within the image. FIG. 14 illustrates an example 1400 in which a quadrilateral may be determined from four line segments within an image in accordance with certain embodiments of the disclosed technology. In such situations, each line segment may intersect with two of the other line segments, thus resulting in four distinct intersection points that form the corners of the quadrilateral.

Figure 15:
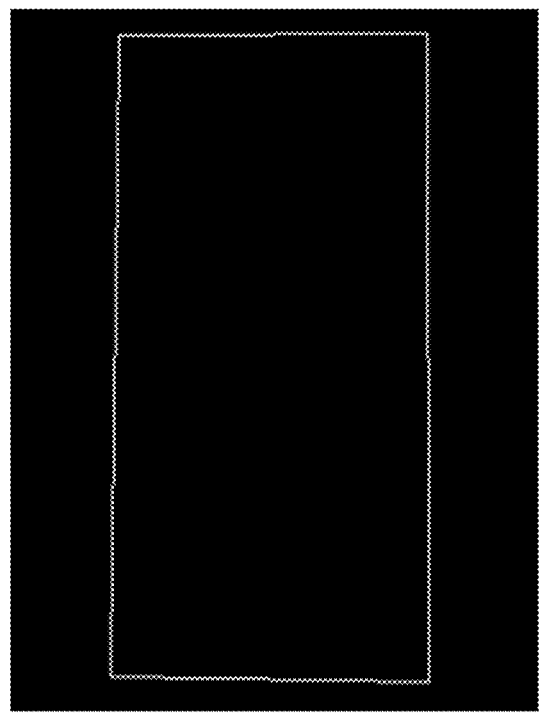
FIG. 15 illustrates an example of a resulting quadrilateral in accordance with certain embodiments of the disclosed technology.

At 114, a quadrilateral representing the borders of the document is provided as an output. FIG. 15 illustrates an example 1500 of a resulting quadrilateral in accordance with certain embodiments of the disclosed technology.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts.

Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A computer-implemented method, comprising:
   receiving an input image of a physical document;
   performing down-sampling on the input image;
   applying median filtering to the input image;
   applying Canny edge detection to the input image;
   performing a Hough transform on the input image;
   responsive to at least one linear structure existing within the input image, generating a set of line segments and grouping the set of line segments into at least one group based on a similarity metric that is based on a location of each of at least one intersection point the line segments have with a side of the input image;
   computing a representative line segment for each of the at least one group;
   based on the representative line segment computed for each of the at least one group, computing a quadrilateral having sides that represent borders of the physical document; and
   providing the computed quadrilateral as an output.

2. The computer-implemented method of claim 1, further comprising a camera capturing the input image.

3. The computer-implemented method of claim 1, wherein the down-sampling removes fine details from the input image that may adversely impact edge detection.

4. The computer-implemented method of claim 1, wherein the median filtering includes removing fine details from the input image based on a selected kernel width.

5. The computer-implemented method of claim 1, further comprising selecting at least one parameter value for the Canny edge detection.

6. The computer-implemented method of claim 1, wherein a result of the Hough transform is no line segments, and further wherein computing the quadrilateral includes selecting the entire input image.

7. The computer-implemented method of claim 1, wherein a result of the Hough transform is a single line segment within the input image that intersects two sides of the input image to establish two quadrilaterals within the input image, and further wherein computing the quadrilateral includes determining which of the two quadrilaterals has a larger area and selecting the quadrilateral that has a larger area.

8. The computer-implemented method of claim 1, wherein a result of the Hough transform is a single line segment within the input image that intersects two diagonal corners of the input image to establish two triangles within the input image, and further wherein computing the quadrilateral includes selecting the entire input image.

9. The computer-implemented method of claim 1, wherein a result of the Hough transform is a single line segment within the input image that intersects two adjacent sides of the input image to establish a triangle and a pentagon within the input image, and further wherein computing the quadrilateral includes moving an intersecting point to a corner to replace the pentagon with a quadrilateral and selecting the quadrilateral.

10. The computer-implemented method of claim 1, wherein a result of the Hough transform is two line segments within the input image that do not intersect, and further wherein computing the quadrilateral includes selecting a quadrilateral formed by four intersection points between the two line segments and sides of the input image.

11. The computer-implemented method of claim 1, wherein a result of the Hough transform is two line segments within the input image that intersect, and further wherein computing the quadrilateral includes selecting a quadrilateral formed by two intersection points between the two line segments and sides of the input image, an intersection point between the two line segments, and a corner of the input image.

12. The computer-implemented method of claim 1, wherein a result of the Hough transform is three line segments within the input image, and further wherein computing the quadrilateral includes selecting a quadrilateral formed by two intersection points between two of the line segments and two intersection points between two of the line segments and sides of the input image.

13. The computer-implemented method of claim 1, wherein a result of the Hough transform is four line segments within the input image, and further wherein computing the quadrilateral includes selecting a quadrilateral formed by intersection points between the line segments.

14. One or more tangible, non-transitory computer-readable media containing computer-executable instructions that, when executed by a processor, cause the processor to perform a method comprising:
   receiving an input image of a physical document;
   performing down-sampling on the input image;
   applying median filtering to the input image;
   applying Canny edge detection to the input image;
   performing a Hough transform on the input image;
   responsive to at least one linear structure existing within the input image, generating a set of line segments and grouping the set of line segments into at least one group based on a similarity metric that is based on a location of each of at least one intersection point the line segments have with a side of the input image;
   computing a representative line segment for each of the at least one group;

based on the representative line segment computed for each of the at least one group, computing a quadrilateral having sides that represent borders of the physical document; and providing the computed quadrilateral as an output.

15. A system, comprising:

a camera configured to capture an input image of a physical document; and a processor configured to:
   receive the input image;
   perform down-sampling on the input image;
   apply median filtering to the input image;
   apply Canny edge detection to the input image;
   perform a Hough transform on the input image;
   responsive to at least one linear structure existing within the input image, generate a set of line segments and group the set of line segments into at least one group based on a similarity metric that is based on a location of each of at least one intersection point the line segments have with a side of the input image;
   compute a representative line segment for each of the at least one group;
   based on the representative line segment computed for each of the at least one group, compute a quadrilateral having sides that represent borders of the physical document; and
   provide the computed quadrilateral as an output.

16. The system of claim 15, further comprising a mobile electronic device, wherein the processor is integrated with the mobile electronic device.

17. The system of claim 16, wherein the camera is integrated with the mobile electronic device.

18. The system of claim 16, wherein the mobile electronic device is a smartphone.

19. The system of claim 15, further comprising a storage device configured to store the computed quadrilateral.

20. The system of claim 15, further comprising a display device configured to visually display the computed quadrilateral.

* * * * *

UNITED STATES PATENT AND TRADEMARK OFFICE
CERTIFICATE OF CORRECTION

PATENT NO. : 10,275,888 B2  
APPLICATION NO. : 15/421106  
DATED : April 30, 2019  
INVENTOR(S) : Erdemir et al.

Page 1 of 1

It is certified that error appears in the above-identified patent and that said Letters Patent is hereby corrected as shown below:

In the Specification

In Column 3, Line 66, delete "(p)" and insert -- ($\rho$) --, therefor.

Signed and Sealed this
Twenty-first Day of July, 2020

Andrei Iancu
*Director of the United States Patent and Trademark Office*